(No Model.)
I. W. HEYSINGER.
COMBINED BIT BRACE AND WASHER CUTTER.
No. 286,610. Patented Oct. 16, 1883.
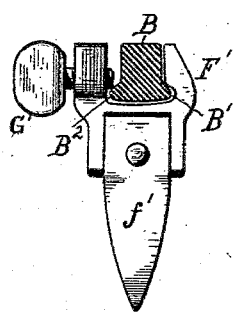
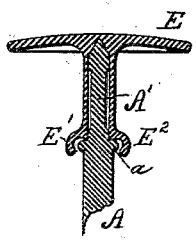
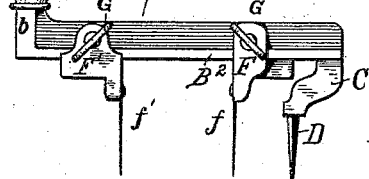
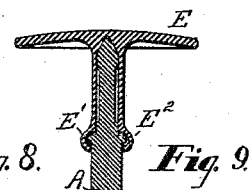
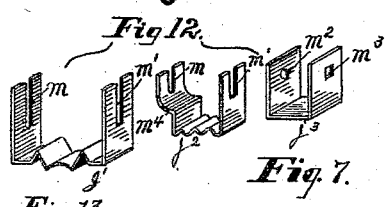
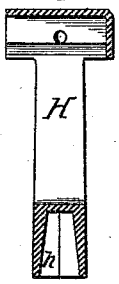
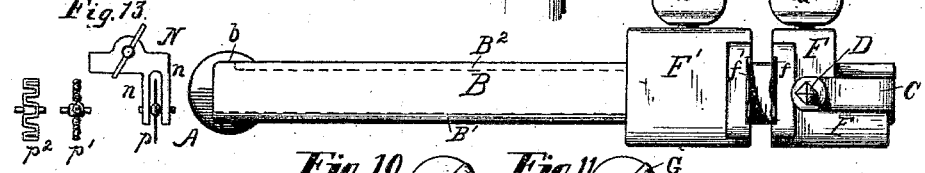
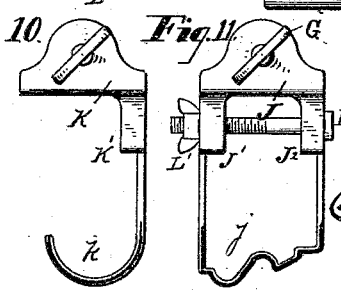
WITNESSES:
INVENTOR
Isaac W. Heysinger

UNITED STATES PATENT OFFICE.

ISAAC W. HEYSINGER, OF PHILADELPHIA, PENNSYLVANIA.

COMBINED BIT-BRACE AND WASHER-CUTTER.

SPECIFICATION forming part of Letters Patent No. 286,610, dated October 16, 1883.

Application filed July 6, 1883. (No model.)

*To all whom it may concern:*

Be it known that I, ISAAC W. HEYSINGER, of Philadelphia, county of Philadelphia, and State of Pennsylvania, have invented a certain new and useful Improvement in Extension-Bit Tools, of which the following is a full, clear, and exact description, reference being had to the drawings accompanying and forming a part of this specification, in which—
Figure 1 is a side view of one of the tools embodying my invention, adapted for cutting out washers, packing-rings, or similar objects. Fig. 2 is a front view of one of the cutters $f'$ and its supporting-head $F'$, the arm of the brace upon which it slides being shown in section. Fig. 3 is a perspective view of the cutter $f$ and its supporting-head F. Figs. 4 and 5 show the method of attaching the head of the brace to the stem $A'$, which rotates within the socket of the head E. Fig. 6 is a side view of the stem which rotates in said socket of the head E. Fig. 7 is a view from beneath of the lower arm of the brace, showing the sliding cutters and the pin or shank upon which, as a center, the said cutters rotate when the brace is revolved. Fig. 8 shows in vertical cross-section a supplemental part adapted to be applied to the free end of the arm B, and provided with a socket, into which may be inserted an ordinary brace-bit for various uses, such as boring holes, putting in screws, &c. Fig. 9 is a vertical transverse sectional view of the attachment shown in Fig. 8. Fig. 10 shows one of the cutters made in the form of the segment of a circle, to adapt the tool for cutting out circular grooves in panels, &c. Fig. 11 shows a cutter for cutting out a circular molding of various fanciful designs, ogees, irregular curves, bevels, &c., the cutter being attached to the head J at both sides, so as to give greater firmness to the cutter and increased strength of construction, the said cutter being readily removed from the head J and replaced by one of different shape. Fig. 12 shows various forms of these interchangeable cutters, ready for insertion in the grooves provided therefor in the cutter-head J of Fig. 11, where they are retained by the screw-bolt $L\ L'$ therein shown. Fig. 13 shows a spur or embossing wheel adapted to be used with this tool for laying off the teeth of gears or spacing distances, or for various ornamental purposes. These wheels may be of graduated sizes to correspond with distances marked on the arm B, to adapt the same for spacing circles into degrees or parts thereof, and may have their peripheries formed in various ways.

The lettering in all the various figures is uniform.

The first part of my invention relates to the construction and arrangement of the various parts thereof, whereby a tool, substantially of the form of an ordinary brace, is provided with one or more cutters adapted to slide laterally upon the lower transverse arm of said brace, and which said cutters may be fixed at any point desired relatively to a center-point attached to said brace, so that circles or rings of various sizes may be readily cut from leather, paper, metal, rubber, wood, or like material, or a circular hole be cut therein, the whole tool being made more compact, stronger, cheaper, and more resistant against strain than where the extension-cutters are attached to the centering shank-pin, as is ordinarily done.

The second part of my invention relates to the means I employ for attaching the stationary head to the stem of the brace, which rotates therein, whereby greater economy and strength are secured.

The third part of my invention relates to the use of a supplemental and detachable shank arranged to be used with a brace having a center-point and cutters such as I employ, said shank being provided with a socket adapted to receive ordinary bits of the various forms used in braces, whereby the tool is adapted for many purposes not otherwise possible.

The fourth part of my invention consists of the use of cutters for cutting out various forms of circular grooves or moldings, whereby different cutters may be used at will with the same cutter head or support, and readily inserted or replaced.

The fifth part of my invention relates to the adaptation, in a combination-tool such as I describe, of a spaced, spur, embossing, or marking wheel for laying off gears or graduated distances in circles or parts thereof, or for marking or embossing ornamental designs thereupon.

Referring to the drawings, Figure 1 shows a tool embodying and illustrating more especially the first part of my invention. It consists, essentially, of a brace provided with a head, E, hand-piece A, eccentric thereto, and two lateral or horizontal arms extending from the upper and lower ends of said hand-piece to the axis upon which the brace rotates. The lower arm, B, terminates in a penetrating or centering point, D, at right angles thereto, and pointing downward, so that as the brace is rotated by the hand upon the hand-piece A, the head E being pressed upon at the same time, the point D will penetrate any suitable material placed beneath. The lateral arm B is horizontal, and carries upon it, laterally movable along the said arm to various distances from the center D, one or more blocks or cutter-heads, F F', to the lower part of which are attached cutters $f$ and $f'$, which, by the rotation of said tool upon the center D, will cut out a solid circle if one cutter be used, and a ring or washer if two cutters be employed. As may be seen by the drawings, it is desirable, in order to cut out narrow rings, to have the two adjacent cutters so mounted upon their heads that they may be brought substantially together, and this is done by mounting the cutters $f$ and $f'$ upon the contiguous faces of F and F'; but it is also desirable, in order to adapt the tool to cut out circles of a small diameter, to bring the cutters closely up to the center pin or point D. As the body of the cutter-head F is necessarily interposed between the cutter $f$ and the center D, I carry the arm B over beyond the axis of rotation, and then connect the pin or point D, which occupies said axis, thereto by an angular or curved piece, C, corresponding in internal form with that part of F which closes thereupon, whereby the two cutters $f$ and $f'$ and the center-point D may all be readily brought into contact, or as nearly so as may be desired. I prefer making the point D square in cross-section and tapering downward, whereby easy penetration is secured, though a pointed pin of circular, semicircular, or triangular cross-section may be used if thought best. In order to enable the cutter-heads F and F' to slide freely to and fro upon the arm B without dropping therefrom, and also to support the said cutters against the great twisting-strain to which they are subjected in use, I provide the arm B with flanges B' B², running along the lower edge on each side of said arm. These flanges, as shown in Fig. 2, are beveled or thinned toward the free edges thereof, so that the cutter-heads, which are grooved on a corresponding bevel, (see Fig. 2,) may be drawn up and tightened against said bevels, as will be hereinafter shown. As seen in Fig. 2, the cutter-head F' consists of a downwardly-projecting part, grooved vertically, if desired, to carry the cutter $f'$, which is screwed or otherwise firmly attached thereto, and extending above it a bifurcated part, one side of which carries the set-screw G', and the other rides, by a correspondingly-tapered groove, but slightly narrower than the flange, upon the flange B' of the arm B, and is brought up hard against it by the screw G'. The said screw G' engages against the upper bevel of the flange B², and, as the cutter-head is of considerable length along the bar B, it is held rigidly and can neither vibrate laterally nor longitudinally when in use, and the same is accomplished without the employment of mechanical fitting or special nicety or accuracy of construction. Simple castings of malleable iron or drop-forgings unfinished will answer every purpose. It will be seen that the strain of rotation as the handle is turned to the right is not upon the screw, but upon the groove of the cutter-head and the flange of the bar B, and if these be made sufficiently strong it is all that will be required, the only function of the screw being to prevent lateral slip of the cutter-head along the arm B. The action, in fact, is the same as that used in tools for rolling logs in saw-mills, where there is a simple lever with an overhooked swinging claw to engage with the opposite side and turn the log, no counterpart of the screw G, however, being there used. To prevent the cutter-head F' from dropping off the rear end of the bar B when the screw is loosened, the flange B² is carried up vertically to form a stop, as shown at $b$. There is no such rise or stop, however, at the opposite side, B', the flange there terminating at the horizontal line, so that when the screw G' is sufficiently retracted it will readily slip over the stop $b$, and one or both of the cutter-heads may be removed and other cutter-heads substituted therefor. The cutter-head F, Figs. 3 and 7, is substantially similar in construction to that shown in Fig. 2, except that the part grooved to engage with the flange B' is carried farther forward, as is clearly shown in Fig. 7, sliding alongside the connecting-bar C, the bottom of the head F being cut away for that purpose, the groove, in conjunction with the screw G, holding the parts secure.

To attach the head E to the brace, while any ordinary fastening may be used, I prefer the one shown as a part of this invention. As seen at Fig. 6, the upper part of the brace A is provided with a circumferential bead or collar, $a$, the stem which rotates in the fixed head E projecting thereabove. This stem, as shown at A', I prefer to make slightly smaller in its middle portion, to prevent the roughness of the castings from impeding its motion against the sides of the socket in which it turns; but this is not essential. I terminate the stem A' by a cone, which is stepped into a corresponding seat in the socket of the head E. The head E is formed with a curved upper surface, and beneath it has a hollow socket, which embraces the stem A' of the brace A, extending down nearly to the bead or collar $a$. At opposite sides of the open end of the said socket of the head E, I provide two raised ears or lips, E' and E², (see Fig. 4,) substantially of the form therein shown, so constructed that when the socket is slipped over the stem A' (being made of malleable or wrought iron, brass, or steel) the lips may be closed down by pressure, as in a vise, and the upturned ends locked under the bead or collar $a$, as is shown in Figs. 1 and 5. This construction makes a very cheap and efficient fastening, and is applicable to braces and similar tools in which a stem rotates in a socket, or vice versa, of other forms than the one I herein describe.

To adapt this tool to be used, when occasion requires, as an ordinary brace, with bits for boring holes, or with a screw-driver, I provide an independent bit carrier or head, substantially of the form shown in Figs. 8 and 9. It consists of a head part open at one end and at the bottom, with grooves to correspond with the flanges $B'$ and $B^2$ of the arm B, and with a set-screw, $h'$, and adapted to be slipped over the forward end of the arm B, as shown in Fig. 8, and fixed thereupon by the set-screw $h'$. The lower portion of the head is made open, so as to pass over the angular connecting-arm C and the center-point D, as is seen in Fig. 8. Below this is the socket $h$, in which may be inserted the shank of an ordinary bit. This socket may be provided with a set-screw, or with spring or other jaws of any of the well-known forms in use for similar purposes.

When I wish to use the tool for cutting out ornamental circular moldings of various sectional forms, I employ cutters of other forms, mounted upon the heads F and F'. For instance, in Fig. 10 I show a cutting-knife adapted to cut out a circular groove having the sectional form of a segment of a circle. When the width of this cutter is too great to be sustained readily by one side alone, I carry up both sides of the cutting-knife, as shown in Fig. 11, the lugs $J'$ and $J^2$ of the head J being double, to correspond thereto; or the head may be made solid at $J'$ $J^2$ from side to side. The cutter shown in Fig. 11 is adapted to cut out an ornamental circle of special design, as are those shown in Fig. 12. In order to economize space and money, I adapt these cutters to be used interchangeably with the same head, and for this purpose I attach the cutter $j$ to the head J by a screw-bolt, L, passing through the vertical sides of the cutter $j$ and tightened up by the thumb-nut $L'$. I slot the upper portions of the cutters $j$, $j'$, and $j^2$, as shown in Fig. 12, to allow them to be slipped on or off by merely loosening, without detaching, the screw-bolt L $L'$; or I provide the cutters with perforations $m^2$ $m^3$, as shown in the cutter $j^3$, Fig. 12. These cutting-blades I prefer to form out of a simple flat oblong steel blank, throwing up the ends to form the sides of the cutter and forming the bottom into a cutting-edge in a die. I prefer to grind the steel blank along the edge in the portion occupied by the cutting part to an edge before striking it up into shape, as by this method the edge is very cheaply put on, the tempering and final finishing being given afterward, if required. To vary the spread of the cutting-edges upon a head of uniform size, I employ the shoulder $m^4$, or its converse, whereby the width of cut may be varied at pleasure upon the same head. To prevent the thumb-nut $L'$ from turning in its socket, I make it square in section for a part of its length, the openings in the cutters and in the lug $J^2$ being of a form to correspond therewith.

In certain cases I substitute with this tool, for the cutters above described, a spur or tracing wheel. (Shown in Fig. 13.) I find this appliance very useful for spacing gear-wheels and laying off points at graduated distances, and I sometimes, instead of indenting the points of the teeth into the wood or metal, provide them with coloring-matters to print the points required. I also make the wheel sometimes with marking-edges instead of points, so as to lay out the form of gear-teeth for their entire extent, either by indentation or by colors, as shown at $p^2$, all that is afterward required being to cut out the material so indicated. In such cases it will be well to provide a set of marking-wheels to lay out various gears, which may be used interchangeably with the same head, and also to mark the arm B of the brace with spaces to correspond, or else to measure the distances from the center D to the pitch-line, in order to secure the complete closing of the teeth when the circle is completed. I sometimes provide the ends of the teeth with embossing-dies, or give the whole periphery an embossed or figured design to indent or print the same upon the material used; and I also sometimes substitute a pencil, ink-pencil, or pen, or a brush for the said wheel when continuous lines of various depths of shadow are desired.

While I describe the tool and its various parts in detail, I do not wish to limit myself specifically to the devices shown in the drawings, as the tool is capable of various modifications and inversions of parts in the hands of any good mechanic, whereby the advantages made manifest in my invention may be employed in analogous and equivalent constructions. For instance, the grooves and flanges of the arm B and the cutter-heads F and F' may be inverted; or a single cutter or any number of them may be employed simultaneously. The cutters may be formed integral with the heads, or may be cast in. The heads may be otherwise attached to the bar than by means of screws. The point D may be made detachable, or provided with a slide and set-screw or pressure-spring. The connecting-arm C may be done away with or given a lateral deflection. The hand-piece A may be a loose cover fitted onto the metal; or may be of wood, as may also be the head E. The lugs $E'$ and $E^2$ may be riveted to the head instead of cast on to it; or the whole construction thereof may be inverted, and a multitude of analogous changes may be made without affecting the principles which dominate and give vitality to my invention, being merely mechanical in scope and function, and such as may be made to meet special requirements by any skilled mechanic.

I am aware that straight and curved cutting blades of the forms shown in Figs. 1 and 10 are old in themselves, and I make no claim to the use of such blades apart from a supporting-head substantially as shown and described. Moreover, I do not desire to claim, broadly, in this specification the spacing, marking, embossing, or tracing wheel shown in Fig. 13 apart from the specifically-described head adapted to this tool, but reserve the right to make a separate application hereafter for Letters Patent therefor. The cutter-supporting heads shown in all the various figures are substantially alike as adapted to the horizontal bar B, and are adapted to receive cutting or marking blades of any shape or size desired for the special work required. The cutters shown in Figs. 11 and 12 are the only ones specifically claimed as new in this specification.

Having now described my invention, what I desire to claim, and secure by Letters Patent, is—

1. The combination of the brace A, provided with head E, hand-piece A, bar B, and fixed center-point D, formed integral therewith, with one or more laterally-movable cutters attached to and sliding upon said bar B, substantially as described.

2. In combination with an extension-bit brace having the cutter-guiding bar formed integral therewith, the detachable, interchangeable, and laterally-adjustable heads F, F', J, K, and N, adapted to be applied to the said cutter-guiding bar from the side or rear end thereof, substantially as set forth.

3. In combination with the brace A, provided with the cutter-guiding bar B, having flanges B' and B², or equivalents thereof, one or more cutter-heads, F F' J K N, adapted to embrace and slide laterally upon said guiding-bar B, and provided with an internal groove or its equivalent on one side to correspond with said flange B', and a set-screw, G', upon the opposite side, substantially as herein shown and described.

4. A tool for cutting out rings and washers, consisting of a brace provided with a head, and eccentric hand-piece connected thereto, and having a horizontal cutter-guiding bar which forms the lower arm of said brace, and a fixed center-point near the end of said bar, together with cutter-heads provided with a bifurcation to adapt the same to be applied to the said cutter-guiding bar from the rear or handle portion of the brace, or from the side thereof, supporting downwardly-projecting cutting-blades adapted to cut out rings or washers upon the said center-point as a center, said cutter-heads being movable to and from the center independently of each other, and adapted to be fixed at different points upon said guiding-bar, substantially as described.

5. In combination with one or more adjustable cutter-heads adapted to slide upon the bar B, the center-point D, attached to the said bar B by the connecting-arm C, outside of and eccentric to the center D, substantially as and for the purpose described.

6. The washer-cutting brace A, having the lower arm, B, extending forward beyond its axis of rotation, and connected to the center-point D by the angular arm C, so as to give clearance for the cutter-head F, substantially as set forth.

7. In combination with the cutter-guiding bar B, provided with tapering flanges B' and B², a cutter-head provided with a cutter and internally grooved at one side with a correspondingly-tapering groove not large enough to close completely over said flange B', together with the set-screw G, adapted to impinge upon the guiding-bar B above the tapering flange B² and draw the grooved opposite side of the cutter-head up against the flange B², substantially as described.

8. In combination with one or more cutters having grooved sliding heads and set-screws, the cutter-guiding bar B, provided with the flange B', substantially as described.

9. In combination with one or more detachable cutters and set-screws for attaching the same, the guiding-bar B, having flanges B' and B², and stop $b$, substantially as and for the purpose set forth.

10. The double-flanged guide-bar B B' B², adapted to receive the detachable cutter-heads F, F', K', and J by means of the grooves corresponding to one of said flanges, and set-screws adapted to set up against and above the opposite flanges, substantially as described.

11. In combination with the flanged bar B B', one or more cutter-heads F, F', K, and J, provided with grooves to fit over said flange B' when drawn up against the same, said grooves being sufficiently long to prevent unsteadiness of the cutters $f$, $f'$, $k$, and $j$ when under strain, substantially as described.

12. The combination of the flanged bar B B' with the grooved cutter-heads F, F', K, and J, matched thereto, and the set-screws G G', the whole being so constructed that the resistance of rotation shall draw the grooved sides of the cutter-heads down upon the flange corresponding thereto and relieve the set-screws G G' from strain, substantially as described.

13. The brace A, provided with stem A' and bead or collar $a$, in combination with a head, E, in which the said stem rotates, said head having a socket to fit over said stem A', and one or more lips attached to said head E, adapted to be bent over and under said bead or collar $a$, so as to prevent withdrawal of said head E, substantially as described.

14. The method of attaching movable heads to braces and similar tools by providing the same with a socket having terminal lips, and providing the brace with a stem to enter said socket, and a bead or collar or its equivalent beneath, and closing the said lips down over the said bead or collar, substantially as described.

15. In combination with a brace provided with a fixed center-point, the bit-piece H, having socket $h$, adapted to be slipped over the said center-point and attached to the bar B, substantially as described.

16. In combination with the adjustable and detachable cutter-head J, provided with cutter-seats J' and J², the detachable cutters $j$, $j'$, $j^2$, and $j^3$, having slots $m$, $m'$, $m^2$, and $m^3$, together with the clamping-screw L and thumb-nut L', substantially as described.

17. In combination with a cutter-head of definite width, the interchangeable cutter $j^2$, having the extension-shoulder or its converse $m^4$, to adapt the said head to receive a cutter having a cutting-surface wider or narrower than the supporting-head, substantially as described.

ISAAC W. HEYSINGER.

Witnesses:
P. O'DONNELL,
C. T. QUIN.